United States Patent
Books

(10) Patent No.: US 9,260,101 B1
(45) Date of Patent: Feb. 16, 2016

(54) SYSTEMS, METHODS, AND APPARATUS FOR TRANSIENT TORQUE LIMITING

(71) Applicant: Cummins Inc., Columbus, IN (US)

(72) Inventor: Martin T. Books, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/542,070

(22) Filed: Nov. 14, 2014

(51) Int. Cl.
*B60T 7/12* (2006.01)
*B60W 10/04* (2006.01)
*B60W 10/06* (2006.01)
*B60W 10/08* (2006.01)

(52) U.S. Cl.
CPC ............. *B60W 10/06* (2013.01); *B60W 10/08* (2013.01); *B60W 2510/0657* (2013.01); *B60W 2510/083* (2013.01); *B60W 2710/0666* (2013.01); *B60W 2710/083* (2013.01); *Y10S 903/902* (2013.01)

(58) Field of Classification Search
CPC ..... B60W 10/08; B60W 10/06; B60W 20/00; B60W 2710/083; B60W 10/26; B60W 20/10; B60W 20/1082; B60W 20/1088; B60W 2510/068; B60W 2540/10; B60W 2550/12; B60W 2710/0666; B60K 6/48; B60K 6/445
USPC ................... 701/22, 84, 87, 90, 54, 101, 112; 180/65.28, 65.285, 65.1–65.8, 69.3, 180/69.4, 69.5; 280/479.1; 318/671, 35–54, 318/152; 903/930
See application file for complete search history.

(56) References Cited

U.S. PATENT DOCUMENTS

| | | | |
|---|---|---|---|
| 6,819,006 B2 | 11/2004 | Nakajima et al. | |
| 7,487,757 B2 | 2/2009 | Radovanovic et al. | |
| 7,822,524 B2 | 10/2010 | Tabata et al. | |
| 8,285,470 B2 | 10/2012 | Wang et al. | |
| 9,067,587 B1 * | 6/2015 | Johri ...................... | B60W 20/10 |
| 2007/0078586 A1 * | 4/2007 | Pallett .................... | B60K 6/445 |
| | | | 701/101 |
| 2007/0125083 A1 * | 6/2007 | Rollinger ................. | B60K 6/48 |
| | | | 60/605.1 |
| 2009/0012665 A1 | 1/2009 | Brennan et al. | |
| 2009/0204280 A1 | 8/2009 | Simon, Jr. et al. | |
| 2012/0271492 A1 | 10/2012 | Wang et al. | |
| 2013/0325228 A1 * | 12/2013 | Whitney ............... | B60W 10/06 |
| | | | 701/22 |
| 2015/0167564 A1 * | 6/2015 | Leone .................... | F02D 17/02 |
| | | | 701/102 |
| 2015/0203092 A1 * | 7/2015 | Johri .................... | B60W 20/10 |
| | | | 701/22 |

FOREIGN PATENT DOCUMENTS

| | | |
|---|---|---|
| JP | 04066822 | 3/2008 |
| WO | 2013022816 | 2/2013 |

* cited by examiner

*Primary Examiner* — Muhammad Shafi
(74) *Attorney, Agent, or Firm* — Taft Stettinius & Hollister LLP

(57) ABSTRACT

Systems, apparatus, and methods are disclosed for providing an electrical torque command to an electric motor and/or a combustion torque command to an internal combustion engine in response to a torque output value determined in response to an oxygen limited torque response of a conventional baseline engine and a torque curve of the internal combustion engine of a hybrid or start-stop vehicle.

17 Claims, 8 Drawing Sheets

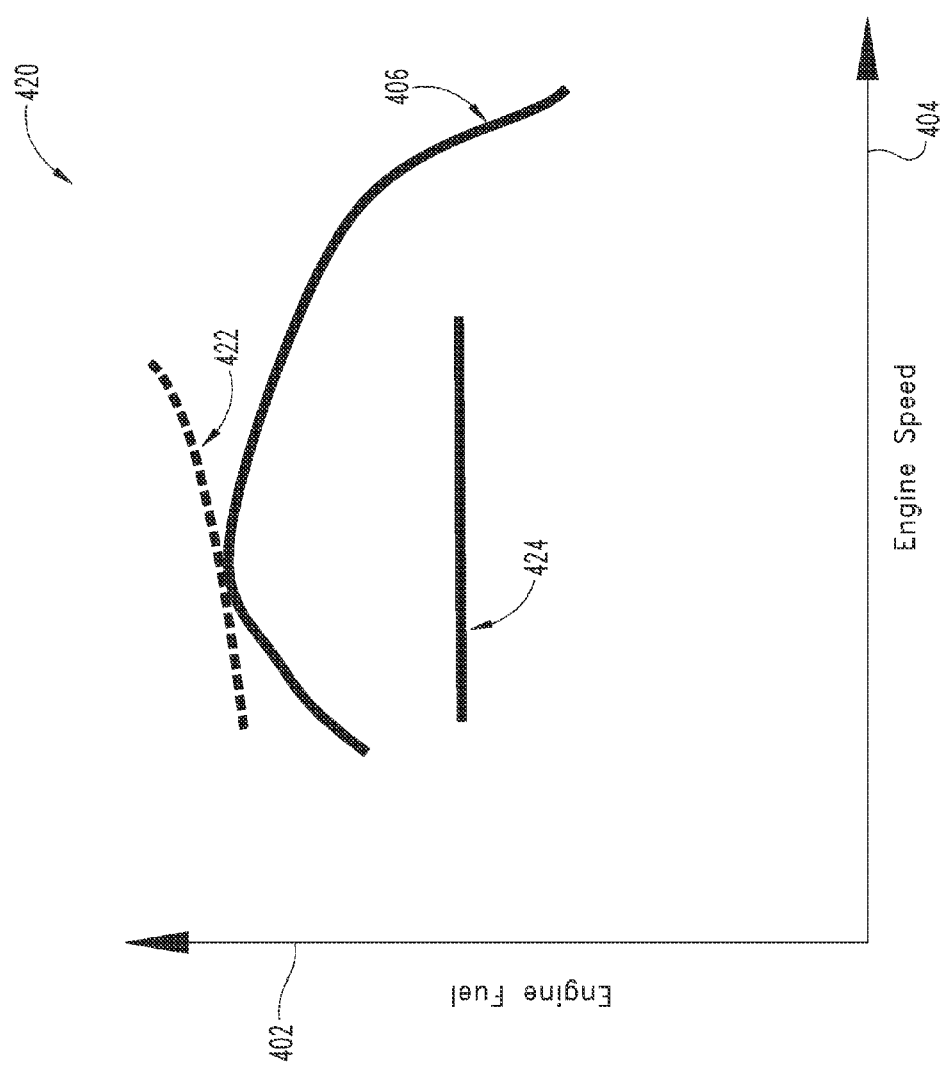

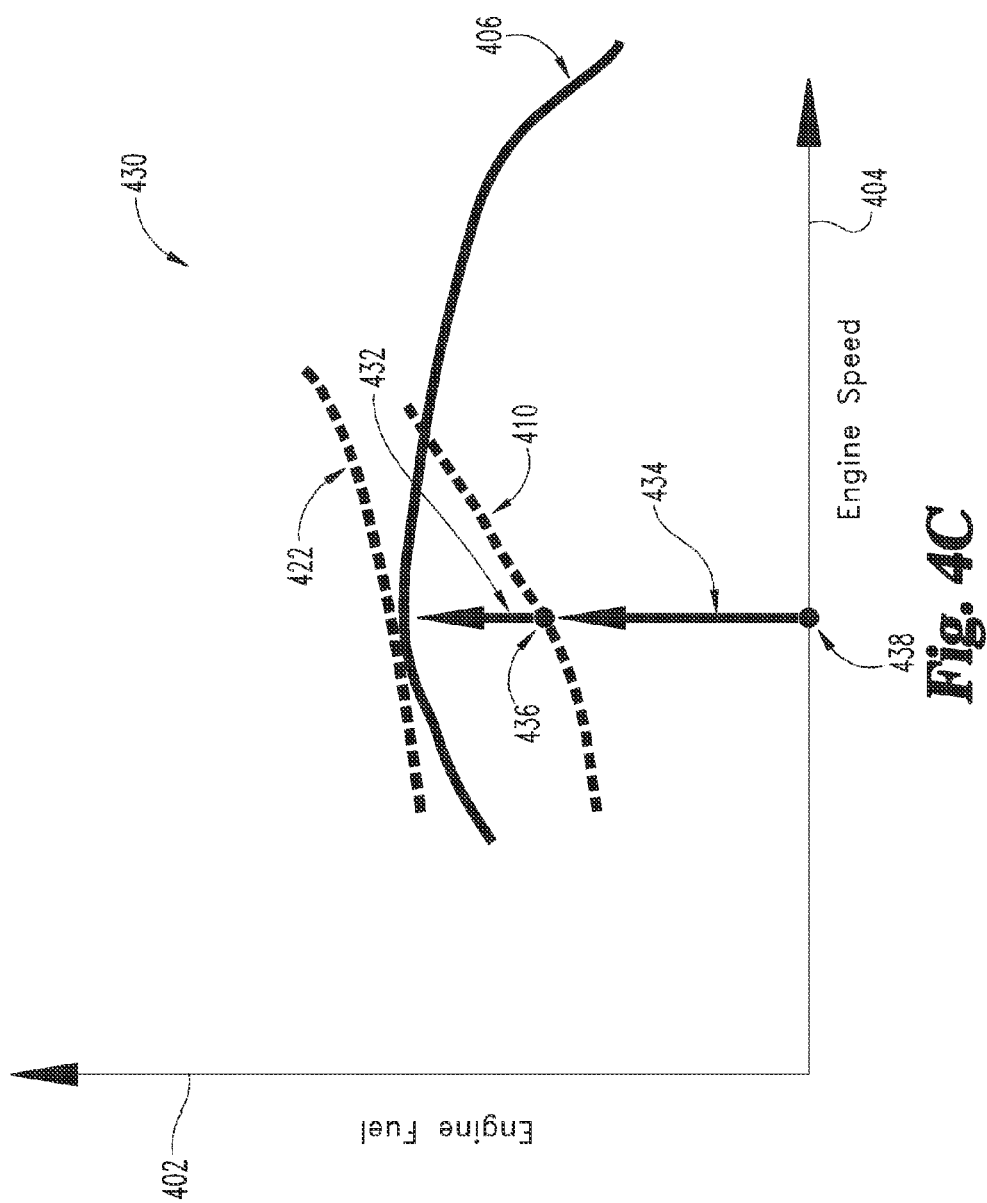

SYSTEMS, METHODS, AND APPARATUS FOR TRANSIENT TORQUE LIMITING

BACKGROUND

The present application generally relates to managing the torque output of a hybrid or start-stop vehicle, and in particular to limiting the torque output during transient conditions. Vehicle torque output may be controlled in various ways, some of which may result in efficiency and/or optimization issues. Therefore, a need remains for further technological developments in this area.

SUMMARY

One embodiment is a unique system and method for limiting the torque output of a hybrid or start-stop vehicle in response to an oxygen limited torque response and a torque curve of the internal combustion engine of the hybrid or start-stop vehicle. Other embodiments include apparatuses, systems, devices, hardware, methods, and combinations for limiting the torque output of a hybrid or start-stop vehicle. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE FIGURES

The description herein makes reference to the accompanying figures wherein like reference numerals refer to like parts throughout the several views, and wherein:

FIG. 4B is a line chart illustrating an example full load limit for an oxygen limited torque response upper boundary at a steady-state fueling increase condition for a conventional baseline engine;

FIG. 4C is a line chart illustrating an example fuel rise on a step fueling increase;

DESCRIPTION OF ILLUSTRATIVE EMBODIMENTS

Figure 1:
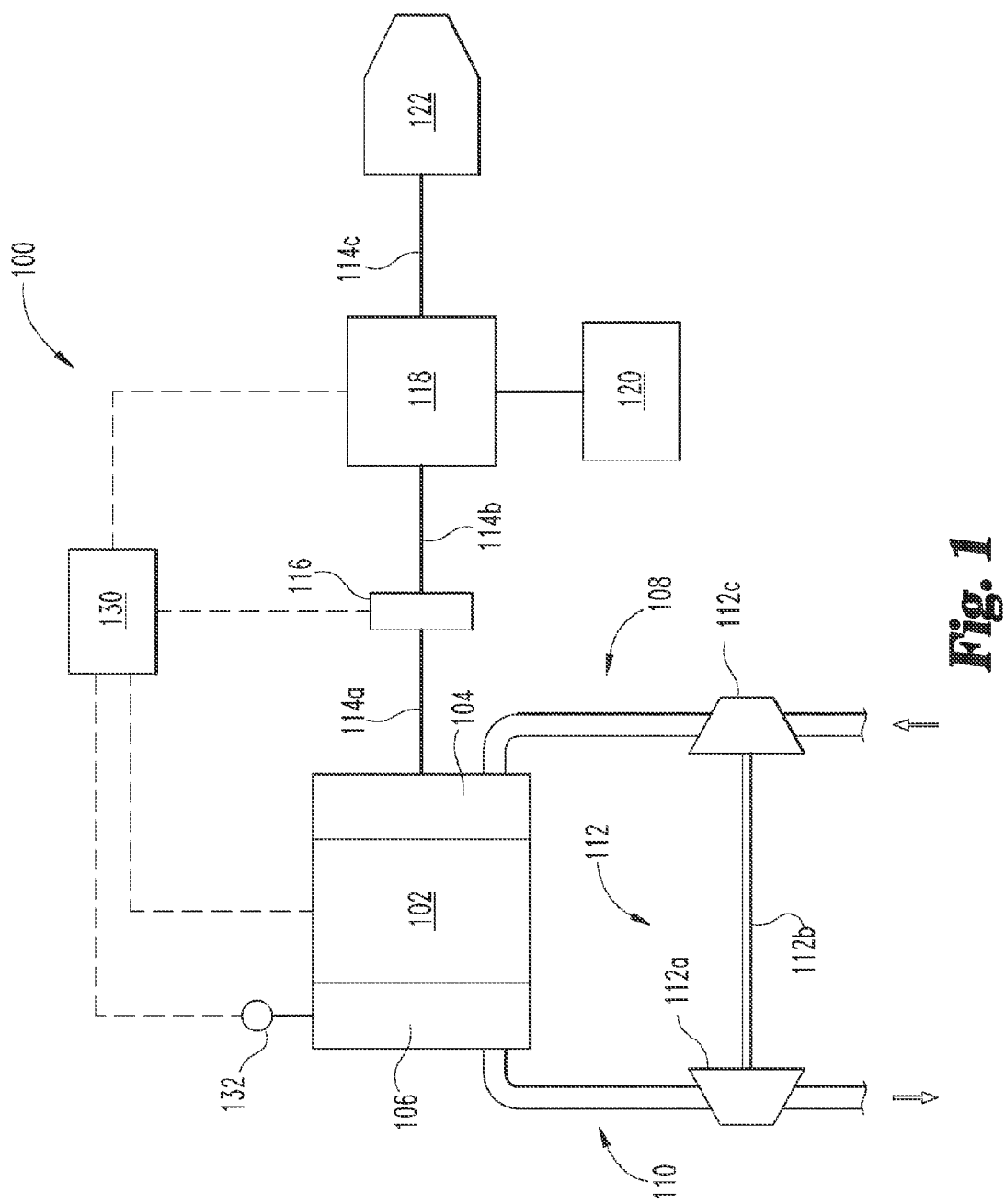
FIG. 1 is a schematic view of an example vehicle system including an engine and an electric motor.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a schematic view of an example hybrid or start-stop vehicle system 100 including an engine 102, such as an internal combustion engine, and an electric motor 118. The engine 102 is in fluid communication with an intake system 108, through which charge air enters an intake manifold 104 of the engine 102, and an exhaust system 110, through which exhaust gas resulting from combustion exits by way of an exhaust manifold 106 of the engine 102, it being understood that not all details of these systems that are typically present are shown. The engine 102 includes a number of cylinders (not shown) forming combustion chambers into which fuel is injected by fuel injectors to combust with the charge air that has entered through intake manifold 104. The energy released by combustion powers the engine 102, typically producing torque on a crankshaft (not shown). Intake valves (not shown) control the admission of charge air into the cylinders, and exhaust valves (not shown) control the outflow of exhaust gas through exhaust manifold 106 and ultimately to the atmosphere.

The vehicle system 100 includes a turbocharger 112 operable to compress ambient air before the ambient air enters the intake manifold 104 of the engine 102 at increased pressure. It is contemplated that in a vehicle system 100 including the turbocharger 112, the turbocharger 112 may include a variable geometry turbocharger (VGT), fixed geometry turbocharger, twin-turbochargers, and/or series or parallel configurations of multiple turbochargers.

The turbocharger 112 includes a bearing housing 112b for housing bearings and a shaft connecting a turbine 112a coupled to the exhaust system 110 with a compressor 112c coupled to the intake system 108. The air from the compressor 112c is pumped through the intake system 108, to the intake manifold 104, and into the cylinders of the engine 102. The intake system 108 and/or exhaust system 110 may further include various components not shown, such as coolers, valves, bypasses, and/or an exhaust gas recirculation (EGR) system, for example.

In the illustrated parallel hybrid configuration, the engine 102 is selectively coupled to a clutch 116, such as an electromagnetic clutch, and the electric motor 118 by connection shafts 114a, 114b. The clutch 116 is selectively engageable to transmit drive torque produced by engine 102 to the electric motor 118 and to transmit torque from the electric motor 118 to engine 102. The vehicle system 100 further includes a transmission 122 for adapting the output torque of the engine 102 and/or the electric motor 118 transmitted via the connection shaft 114c. In certain embodiments, the connection shaft 114c mechanically couples the power train to vehicle drive wheels (not shown) through the transmission 122.

In certain embodiments, the transmission 122 may include a gear box and a second clutch (not shown) that drivingly engages the portion of the connection shaft 114c extending from the electric motor 118. The second clutch can be provided with, for example, an automated manual transmission (AMT). In other embodiments, the transmission 122 includes a manual clutch, or is an automatic transmission and does not include a clutch. Other embodiments contemplate any suitable coupling arrangement between the connection shafts 114a, 114b, 114c and the transmission 122 where the engine 102 and/or the electric motor 118 are capable of providing drive torque to the wheels.

The electric motor 118 is electronically coupled to an electrical energy storage device 120. As used herein, the electric motor 118 refers to one or more electromechanical devices that each include a motor to provide torque to the wheels and/or torque to the connection shafts 114a, 114b to restart the engine 102, for example. In certain embodiments, such as a series hybrid configuration, the electric motor 118 may be coupled to an electric generator (not shown) in combination therewith or an electric generator may be provided as a separate device from the electric motor 118. The electrical energy storage device 120 is electrically connected to the electric motor 118 to store electricity generated by the electric motor 118 or, in other embodiments, is electrically connected to an electric generator that is a separate device.

In certain embodiments, the electrical energy storage device 120 may be a high voltage or low voltage electrical energy storage device or the electrical energy storage device 120 may include each of a high voltage electrical energy storage device and a low voltage electrical energy storage device. The electrical energy storage device 120 may be an electrochemical device such as a lithium ion battery, a lead-acid battery, a nickel metal hydride battery, or any other device capable of storing electrical energy.

In certain embodiments, energy may be stored non-electrically, for example in a high performance fly wheel, in a compressed air tank, and/or through deflection of a high capacity spring. Where the energy is stored electrically, any electrical energy storage device 120 is contemplated herein, including a hyper-capacitor and/or an ultra-capacitor. Although not illustrated, DC-DC converters, power electronics, and other electrical components can be provided to establish electrical connections between electrical energy storage device 120, electric motor 118, and other high voltage loads.

Vehicle system 100 additionally includes an engine speed sensor 132 in electrical communication with an engine speed input of a controller 130. The engine speed sensor 132 is operable to sense instantaneous rotational speed of the engine 102 and produce an engine speed signal indicative of engine rotational speed. In one embodiment, the engine speed sensor 132 is a Hall Effect sensor operable to determine engine speed by sensing passage thereby of a number of equi-angularly spaced teeth formed on a gear or tone wheel. Alternatively, engine speed sensor 132 may be any other known sensor operable as just described including, but not limited to, a variable reluctance sensor or the like. In certain embodiments, vehicle system 100 includes an engine position sensor (not shown) that detects a current position of the crankshaft. It shall be appreciated that the engine speed sensor 132 and/or any other sensor of vehicle system 100 may be a physical sensor, a virtual sensor, and/or a combination thereof.

The controller 130 may be structured to functionally execute operations for managing engine start-stop and powertrain operation. In certain embodiments, the controller 130 may be linked to the engine 102, the clutch 116, the electric motor 118, and/or the electrical energy storage device 120. In certain other embodiments, the controller 130 may be linked to vehicle components and/or various vehicle system 100 sensors through an engine control module (ECM), or engine control unit (ECU) (not shown). In certain embodiments, the controller 130 and/or ECM may form a portion of a processing subsystem including one or more computing devices having memory, processing, and communication hardware. The controller 130 and/or ECM may be a single device or a distributed device, and the functions of the controller 130 and ECM may be performed by hardware or software in a combined controller or separate controllers. In certain embodiments, controller 130 may be a hybrid control module.

Any of the operations of example procedures described herein may be performed at least partially by the controller 130. In certain embodiments, the controller 130 includes one or more modules structured to functionally execute the operations of the controller 130. The description herein including modules illustrates the structural independence of the aspects of the controller 130, and illustrates one grouping of operations and responsibilities of the controller 130. Other groupings that execute similar overall operations are understood within the scope of the present application. Modules may be implemented in hardware and/or instructions stored on a non-transient computer readable medium, and modules may be distributed across various hardware or instructions stored on a non-transient computer readable medium. In some embodiments, the instructions of the module(s) may be executed by a processor of the controller 130 to perform the various operations. More specific descriptions of certain embodiments of controller operations are included in the section referencing FIGS. 2 and 10.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, by receiving a value by which the interpreted parameter can be calculated, and/or by referencing a default value that is interpreted to be the parameter value. Furthermore, it is contemplated that the term sensor as used herein may include a virtual sensor, which may determine a condition directly and/or based on other data. The described examples are non-limiting, and the inclusion of an example should not be considered to limit potential operations of devices or parameters that are either utilized in the examples or omitted from the examples.

Figure 2:
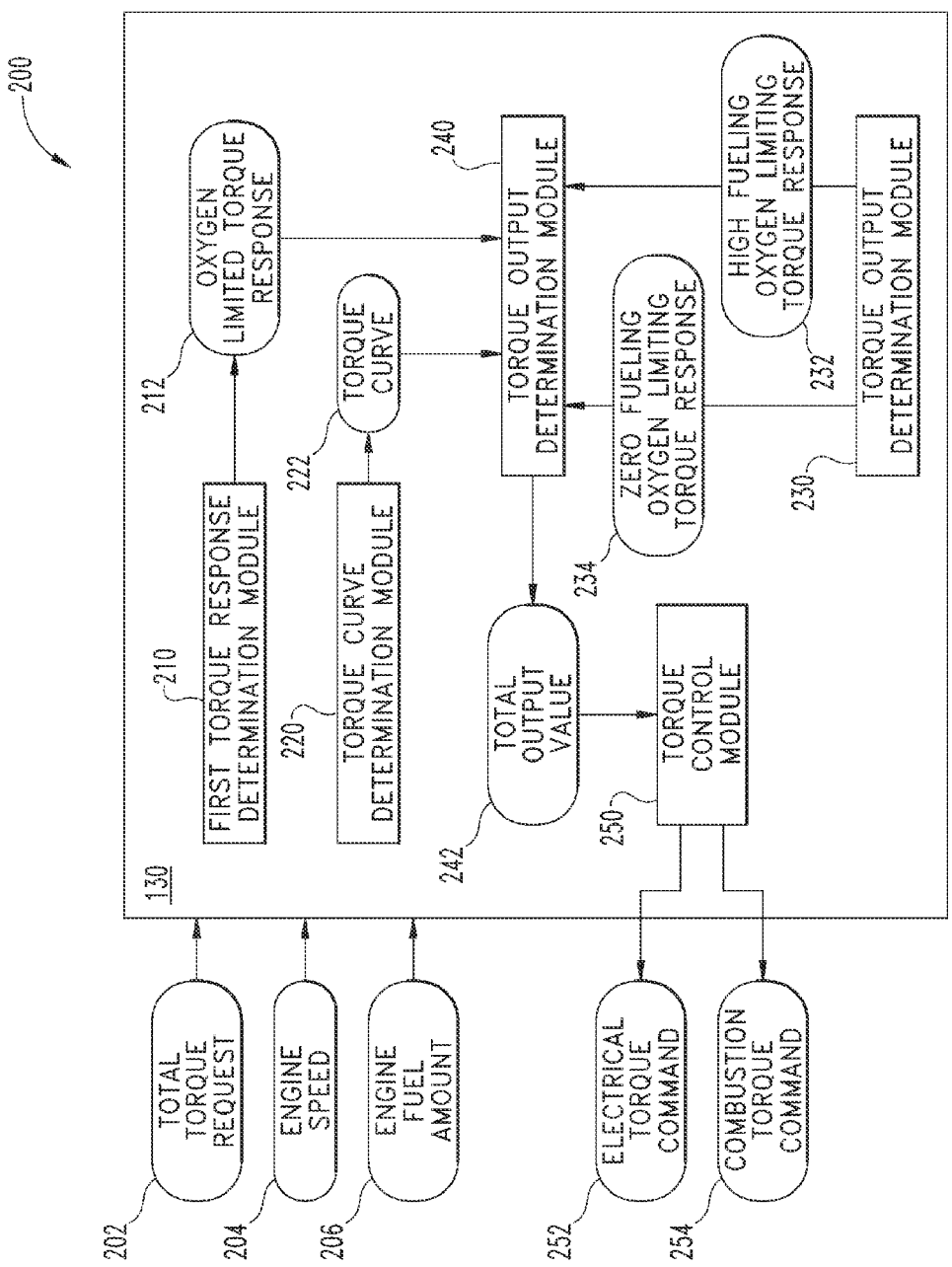
FIG. 2 is a schematic block diagram of an example controller for providing electrical torque commands to the engine and/or the electric motor of FIG. 1.

One example embodiment 200 of the controller 130 is shown in FIG. 2. The controller 130 includes a total torque request input 202, an engine speed input 204, and a current engine fuel amount input 206. In certain embodiments, the total torque request input 202 may be determined by a throttle command from the operator of a vehicle in which the controller 130 resides, the engine speed input 204 may be determined from an engine speed sensor 132, and the current engine fuel amount input 206 may be a fuel amount burned by the engine 102 and/or injected into the exhaust system 110 through an injector or through very late post injection in the engine 102. Inputs to the controller 130 may further include, for example, an acceleration torque request, a deceleration torque request, a vehicle speed, a vehicle system temperature and/or pressure, and the like. In certain embodiments, one or more inputs to the controller 130 may be received from the ECU rather than directly from one of the vehicle system 100 sensors.

In a conventional baseline engine, such as a naturally aspirated gasoline or diesel engine, a large step increase in torque may be limited by the ability to provide adequate airflow for the necessary fuel increase, even at wide open throttle. An oxygen limited condition is created due to the depletion of oxygen from the lack of adequate airflow. An oxygen limited torque response, commonly referred to as a "black smoke limit," typically defines the full load limit of the conventional baseline engine. Being lean of stoichiometric, it is possible to obtain more power by exceeding the oxygen limited torque response, but fueling at this point will result in incomplete combustion, high fuel consumption, and/or increased soot in the exhaust which may result in dense clouds of black smoke being emitted from the exhaust system.

Introducing a turbocharger 112 into the vehicle system 100 may combat the relatively poor low speed torque capability for engines where airflow is a function of engine speed. A turbocharged engine may achieve higher airflow at lower engine speeds, but there are dynamics associated with bringing the turbocharger up to speed. A limit may be reached when stepping torque up from low torque to a point where available airflow results; however, in a short time at the higher fueling condition, the available airflow may increase as the hot exhaust gases cause the turbocharger to spool up.

Steady-state turbocharged engines may reach torque values that may not be immediately achieved on a large step response, which may result in a transient torque limit and/or a higher steady-state torque limit. Generally, the transient torque limit is a function of the power trajectory the engine had been following. With the migration to hybrid vehicle systems and the availability of the electric motor 118 to supplement the torque provided by the engine 102, the transient torque limit and the higher steady-state torque limit may be eliminated altogether. The improved transient response achieved by using the electric motor 118 to supplement torque provided by the engine 102 would make it possible to step torque up from zero torque to full advertised torque, despite any delays in torque contribution from the engine 102.

In certain applications, improved transient torque may not be desired, such as in a hybrid vehicle system, for example, where improved fuel economy is desired over performance. In such applications where improved fuel economy is the desired result, outperforming the conventional baseline engine by using the electric motor 118 may not be desirable. Limiting the torque output of the hybrid vehicle system to mimic the conventional baseline engine's torque response may be desirable in applications where improved fuel economy is the desired result. Simply limiting the hybrid vehicle system torque output to the internal combustion engine of the hybrid vehicle system may not be desirable, as a common feature of hybrid vehicle systems is using a downsized internal combustion engine.

Using a downsized internal combustion engine as a reference for a transient torque limit of the hybrid vehicle system may not be practical, however, as the transient torque limit due to turbocharger lag may be proportionally lower than the conventional baseline engine. In certain embodiments, an estimated transient torque limit of the conventional baseline engine may be imposed on the hybrid vehicle system. In one non-limiting embodiment, a behavioral model may be implemented by the controller 130 that attempts to duplicate the behavior of the transient torque limit of the conventional baseline engine. In another non-limiting embodiment, a physics-based model may be implemented by the controller 130 that physically models the actual performance of the conventional baseline engine to determine the transient torque limit estimation.

In certain embodiments, to determine the transient torque limit estimation, the controller 130 includes a first torque response determination module 210, a torque curve determination module 220, a second torque response determination module 230, a torque output determination module 240, and a torque control module 250. Other controller 130 arrangements that functionally execute the operations of the controller 130 are contemplated in the present application.

The first torque response determination module 210 is structured to receive and interpret the total torque request input 202, the engine speed input 204, and/or the current engine fuel amount input 206 to determine an oxygen limited torque response 212 of a conventional baseline engine, for example, based on a torque curve of the conventional baseline engine. The torque curve determination module 220 is structured to receive and interpret the total torque request input 202, the engine speed input 204, and/or the current engine fuel amount input 206 to determine a torque curve 222 of the engine 102. The second torque response determination module 230 is structured to receive and interpret the total torque request input 202, the engine speed input 204, and/or the current engine fuel amount input 206 to determine a zero fueling oxygen limited torque response 234 of the conventional baseline engine and/or a high fueling oxygen limited torque response 232 of the conventional baseline engine, for example, based on a torque curve of the conventional baseline engine.

The torque output determination module 240 is structured to receive and interpret the oxygen limited torque response 212 from the first torque response determination module 210, the torque curve 222 of the internal combustion engine from the torque curve determination module 220, the zero fueling oxygen limited torque response 234 of the conventional baseline engine and/or the high fueling oxygen limited torque response 232 of the conventional baseline engine from the second torque response determination module 230. The torque output determination module 240 is further structured to determine a torque output value 242 based on the oxygen limited torque response 212, the torque curve 222, the zero fueling oxygen limited torque response 234, and/or the high fueling oxygen limited torque response 232.

In certain embodiments, the torque output value 242 may be further based on an interpolation between the zero fueling oxygen limited torque response 234 and the high fueling oxygen limited torque response 232. In some embodiments, the interpolation may include filtering a transient torque from the zero fueling oxygen limited torque response 234 toward the high fueling oxygen limited torque response 232. In certain embodiments, where the filtered transient torque exceeds the torque curve of the engine 102, the zero fueling oxygen limited torque response 234 and/or the high fueling oxygen limited torque response 232 may not be included in the interpolation. In additional embodiments, the interpolation may include modeling the torque response of the conventional baseline engine, modeling the torque response of the conventional baseline engine at vehicle system 100 launch, and/or modeling the torque response of the conventional baseline engine at vehicle system 100 launch due to a lag of the turbocharger 112 in the hybrid vehicle system.

The torque control module 250 is structured to receive and interpret the torque output value 242 from the torque output determination module 240. The torque control module 250 is further structured to determine and output an electrical torque command 252 and/or a combustion torque command 254 based on the torque output value 242.

Operations illustrated are understood to be example only, and operations may be combined or divided, and added or removed, as well as re-ordered in whole or part, unless stated explicitly to the contrary herein.

Figure 3:
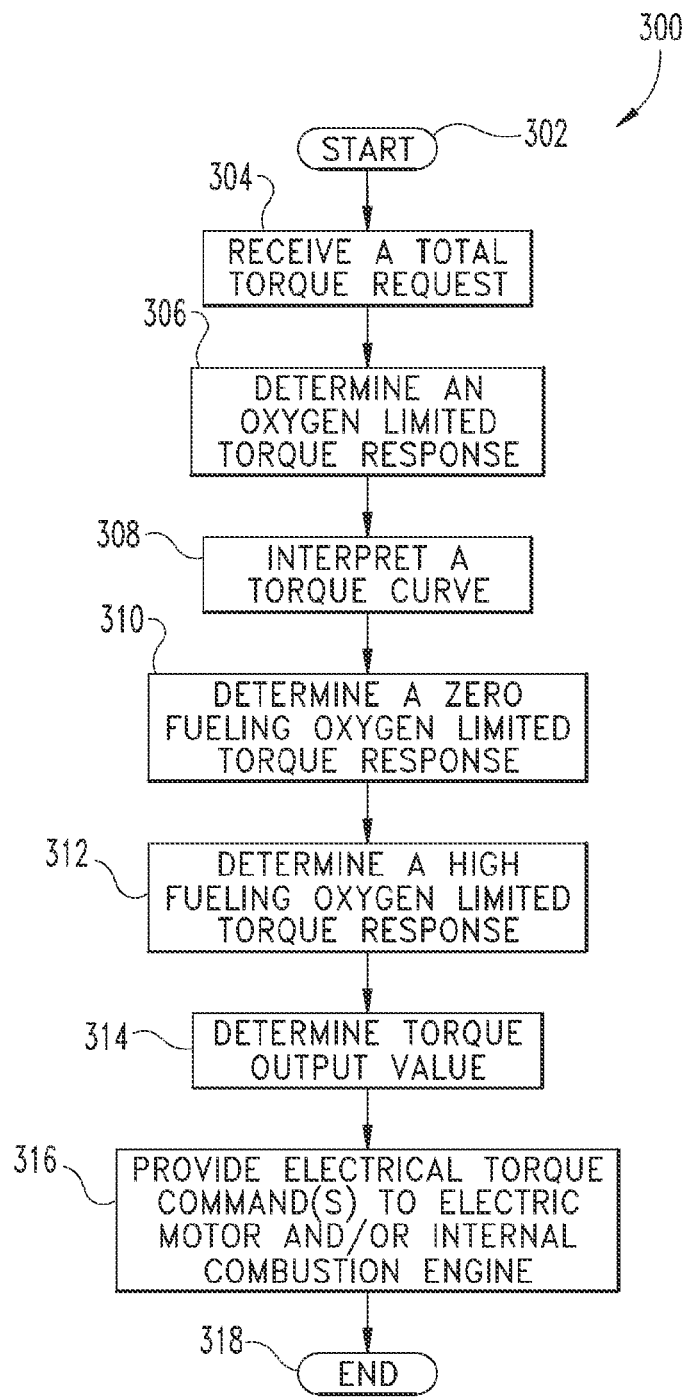
FIG. 3 is a flow diagram of an example procedure for providing electrical torque commands to the engine and/or the electric motor of FIG. 1.

With reference to FIG. 3, there is illustrated a flow diagram of a procedure 300 for providing electrical torque commands. Procedure 300 begins at operation 302 in which a control routine for providing electrical torque commands to the internal combustion engine 102 and/or the electric motor 118 is started. Operation 302 can begin by interpreting a key-on event and/or by initiation by an operator or technician. Operation 302 may additionally or alternatively include interpreting a communication or other parameter indicating that another iteration of procedure 300 may restart upon completion of procedure 300.

Procedure 300 continues to operation 304 where a total torque request is received by a throttle command from the operator of the vehicle system 100, for example. From operation 304, procedure 300 continues to operation 306 to determine an oxygen limited torque response of a conventional baseline engine. In certain embodiments, a physics-based model may be used to physically model the performance of the conventional baseline engine for determining the oxygen limited torque response. In certain other embodiments, a behavioral model may be used to attempt to replicate the behavior of the conventional baseline engine for determining the oxygen limited torque response. In still other embodiments, a combination of the physics-based model and the behavioral model may be used.

Procedure 300 continues from operation 306 to operation 308 where a torque curve of the engine 102 is interpreted based on the total torque request, a speed of the engine 102, and/or a fuel amount of the engine 102. In certain embodiments, the speed of the engine 102 may be determined by detecting the instantaneous rotational speed of the engine 102 using the engine speed sensor 132, for example. In certain embodiments, the fuel amount of the engine 102 may be a fuel amount burned by the engine 102. Additionally or alternatively, the fuel amount of the engine 102 may be an amount of fuel injected into the exhaust system 110 through an injector or through very late post injection in the engine 102.

From operation 308, procedure 300 continues to operation 310 to determine a zero fueling oxygen limited torque response of the conventional baseline engine. Procedure 300 then continues to operation 312 to determine a high fueling oxygen limited torque response of the conventional baseline engine. Procedure 300 continues to operation 314 to determine a torque output value based on the oxygen limited torque response determined at operation 306, the torque curve interpreted at operation 308, the zero fueling oxygen limited torque response determined at operation 310, and/or the high fueling oxygen limited torque response determined at operation 312. From operation 314, procedure 300 continues to operation 316 to provide electrical torque command(s) to the electric motor 118 and/or the engine 102 based on the torque output value determined at operation 314 before completing procedure 300 at operation 318.

Figure 4A:
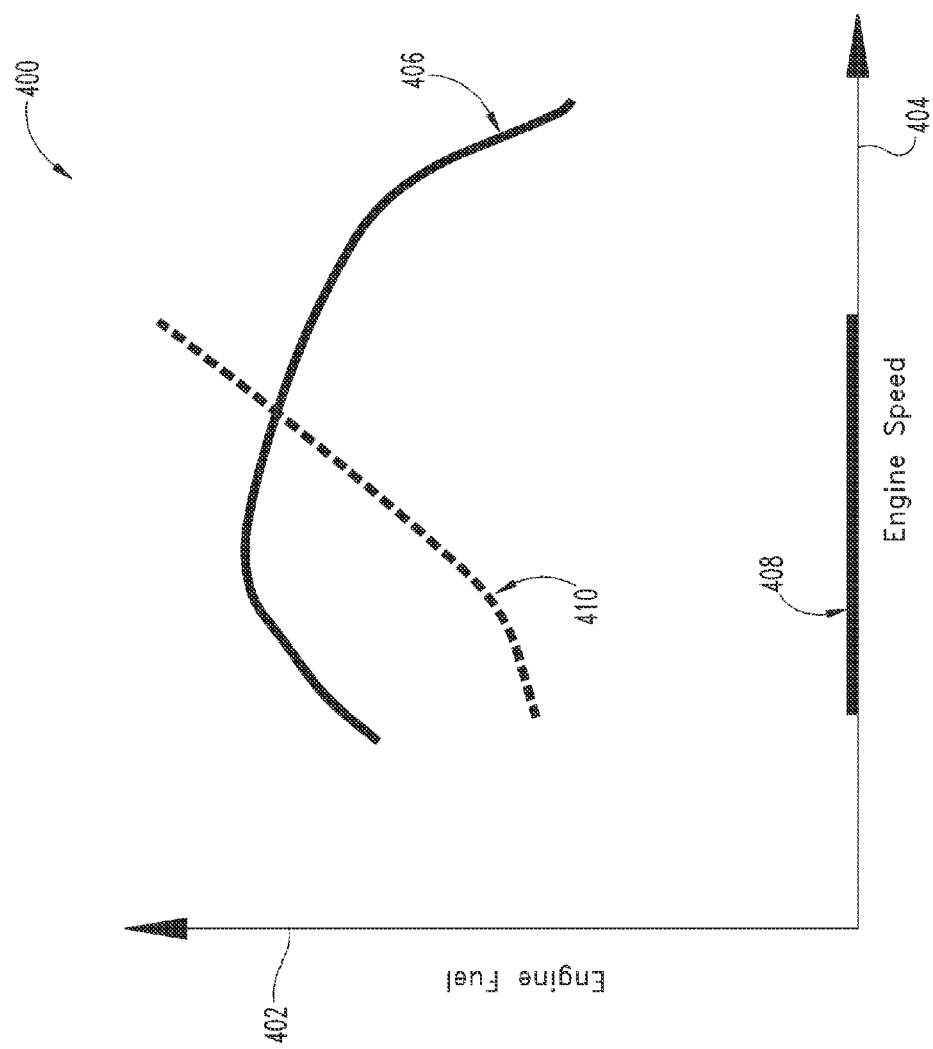
FIG. 4A is a line chart illustrating an example lower oxygen limited torque response boundary for an oxygen limited torque response minimum ceiling at a zero fueling condition for a conventional baseline engine.

With reference to FIGS. 4A-4D, an example model for approximating transient oxygen limited torque response limiting on transients of the conventional baseline engine is illustrated. FIG. 4A illustrates a line chart 400 of data representing an oxygen limited torque response lower boundary 410 at a zero fueling condition (e.g., a motoring condition) for the conventional baseline engine. Line chart 400 includes an engine fuel amount along a y-axis 402 and an engine speed along an x-axis 404. Line chart 400 additionally includes a torque curve 406 of the conventional baseline engine and a fuel level 408 at zero fueling. Since the turbocharger 112 is typically going as slow as it can at zero fueling, the oxygen limited torque response lower boundary 410 represents a minimum ceiling.

FIG. 4B illustrates a line chart 420 of data representing a full load limit for an oxygen limited torque response upper boundary 422 at a steady-state fueling increase condition for the conventional baseline engine. Line chart 420 includes the engine fuel amount along the y-axis 402 and the engine speed along the x-axis 404. Line chart 420 additionally includes the torque curve 406 of the conventional baseline engine and a fuel level 424 at a minimum steady-state fuel level. As steady-state fueling increases, the oxygen limited torque response upper boundary 422 increases. When the fuel level 424 is at some elevated fueling value for which the oxygen limited torque response upper boundary 422 fully exceeds the torque curve 406, the oxygen limited torque response upper boundary 422 is no longer a potential limit.

FIG. 4C, illustrates a line chart 430 of data representing a fuel rise as an oxygen limited torque response 436 increases from the oxygen limited torque response lower boundary 410 to the oxygen limited torque response upper boundary 422 on a step fueling increase. Line chart 420 includes the engine fuel amount along the y-axis 402 and the engine speed along the x-axis 404. Line chart 420 additionally includes the torque curve 406, the oxygen limited torque response lower boundary 410, and the oxygen limited torque response upper boundary 422. Line chart 420 further includes a first fuel rise 432 representing an instantaneous fuel step up at a throttle tip-in event 438 and a second fuel rise 434 from the oxygen limited torque response lower boundary 410 to the torque curve 406 of the conventional baseline engine. Following turbocharger dynamics, the second fuel rise 434 may be slow from the oxygen limited torque response lower boundary 410 to the torque curve 406.

Figure 4D:
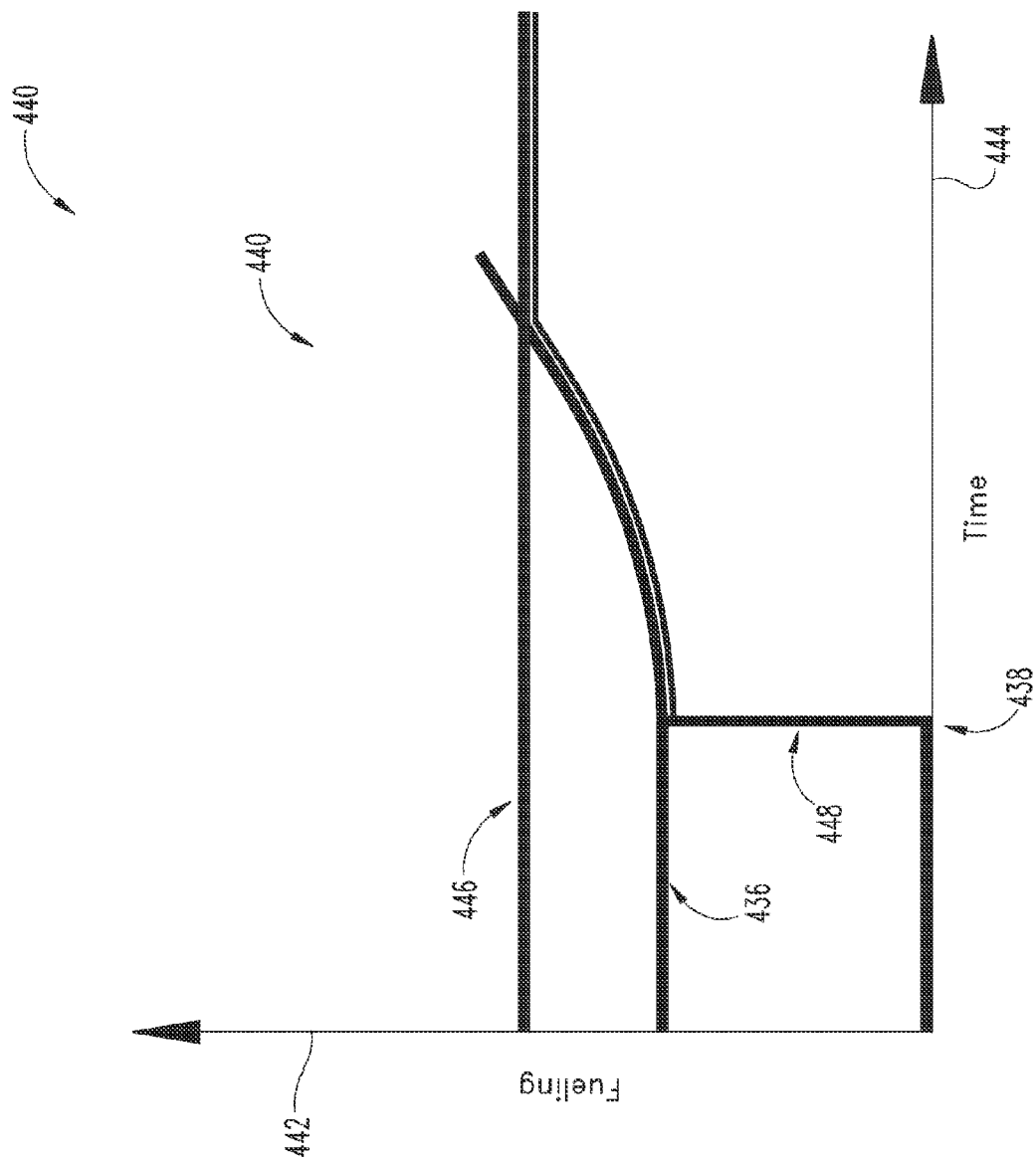
FIG. 4D is a line chart illustrating an example rise time of the fuel rise of FIG. 4C.

FIG. 4D illustrates a line chart 440 of data fur determining a fuel rise rate on a step fueling increase. Line chart 440 includes an engine fueling along a y-axis 442 and a time along an x-axis 444. Line chart 440 additionally includes a torque curve fueling amount 446, an oxygen limited torque response 436, the throttle tip-in event 438, and a total fueling amount 448. The total fueling amount 448 steps up to the oxygen limited torque response 436 instantaneously, while the total fueling amount 448 rises more slowly as it tracks the oxygen limited torque response 436 during resultant turbo speed increase until the torque curve fueling amount 446 is reached. In certain embodiments, the fuel rise rate may be fitted to an equivalent time constant for approximating transient oxygen limited torque response limiting on transients of the conventional baseline engine.

Figure 5:
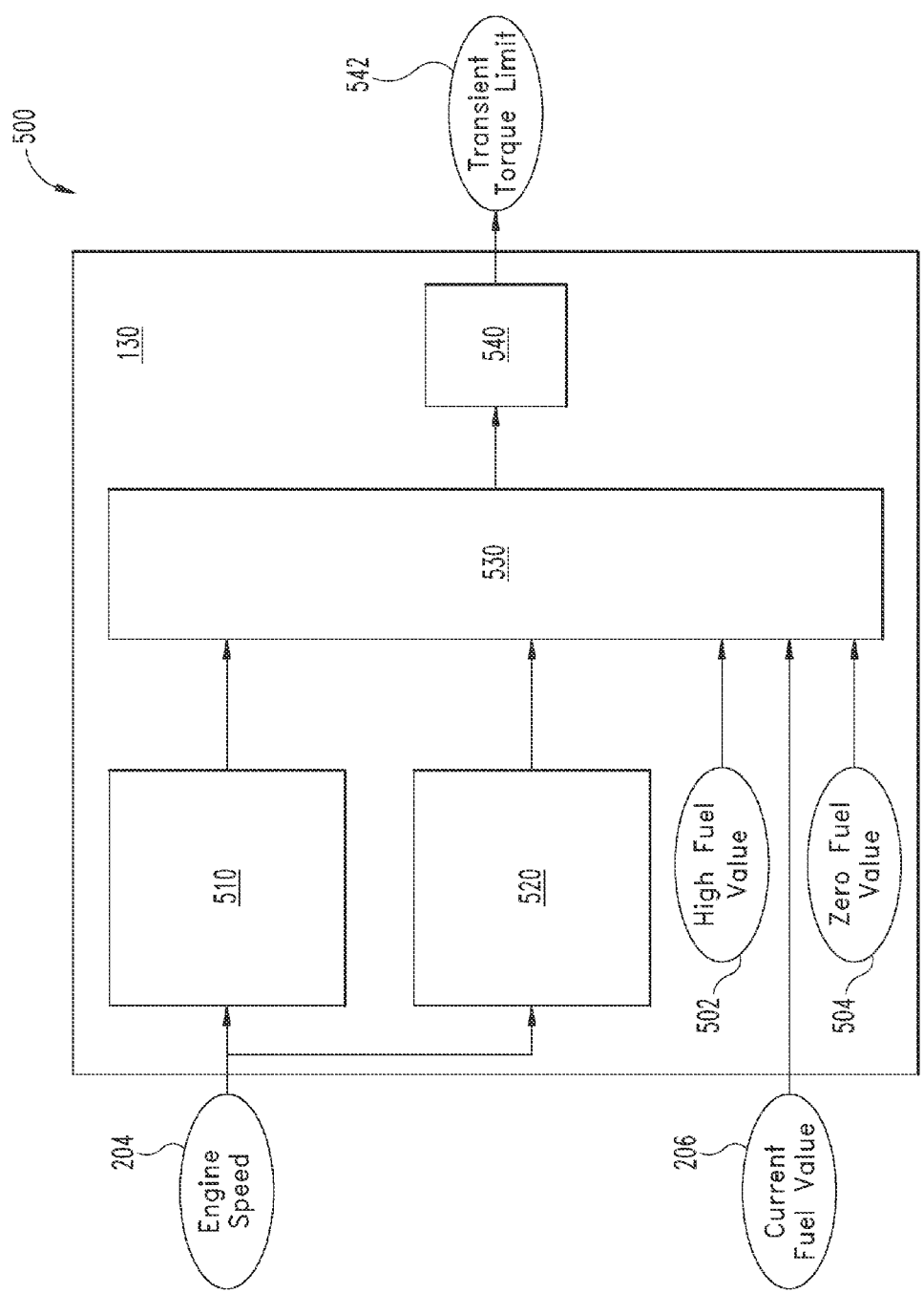
FIG. 5 is a schematic block diagram of an example controller for estimating a transient torque limit based at least in part on data determined from FIGS. 4A-4D.

With reference to FIG. 5, there is illustrated a schematic block diagram of an example embodiment 500 of the controller 130 for estimating a transient torque limit. The controller 130 in embodiment 500 is structured to receive and interpret the engine speed input 204 and the current engine fuel amount input 206. The controller 130 in embodiment 500 includes a high fuel determination module 510, a zero fuel determination module 520, an interpolation module 530, and a filter module 540. The high fuel determination module 510 is structured to determine the oxygen limited torque response upper boundary 422. The zero fuel determination module 520 is structured to determine the oxygen limited torque response lower boundary 410.

The interpolation module 530 is structured to receive and interpret a high fuel value 502, a zero fuel value 504, the oxygen limited torque response upper boundary 422 from the high fuel determination module 510, and/or the oxygen limited torque response lower boundary 410 from the zero fuel determination module 520. The interpolation module 530 may be further structured to interpolate between the oxygen limited torque response lower boundary 410 and the oxygen limited torque response upper boundary 422. In certain embodiments, the interpolation module 530 may be further structured to filter a transient torque from the oxygen limited torque response lower boundary 410 toward the oxygen limited torque response upper boundary 422. In certain other embodiments, the interpolation module 530 may be further structured to model the torque response of the conventional baseline engine, model the torque response of the conventional baseline engine at vehicle system 100 launch, and/or model the torque response of the conventional baseline engine at vehicle system 100 launch due to a lag of the turbocharger 112 in the hybrid vehicle system.

The filter module 540 is structured to receive and interpret an interpolated output from the interpolation module 530, apply a filter to the interpolated output, and output an estimated transient torque limit 542. In certain embodiments, the filter module 540 may apply a low pass filter, such as a zero phase shift low pass filter. Different types of filters are contemplated, such as a high pass fitter, a band pass filter, and a moving average filter, for example. In certain embodiments, the current engine fuel amount input 206 may be filtered in addition to or in alternative to the interpolated output. It is further contemplated that other signals may be filtered, such as where noise is present in the signal, for example.

Various aspects of the systems, apparatus, and methods are disclosed herein. For example, one aspect involves a method including receiving a total torque request of a hybrid vehicle including an electric motor and an internal combustion engine, determining an oxygen limited torque response of a conventional baseline engine, interpreting a torque curve of the internal combustion engine, determining a torque output value in response to the oxygen limited torque response and the torque curve, and providing an electrical torque command to the electric motor and a combustion torque command to the internal combustion engine in response to the torque output value.

In one embodiment, the method further includes determining a zero fueling oxygen limited torque response of the conventional baseline engine. The determining the torque output value comprises determining the torque output value corresponding to the zero fueling oxygen limited torque response of the conventional baseline engine in response to a throttle tip-in event. In another embodiment, the method further includes determining a zero fueling oxygen limited torque response of the conventional baseline engine and a high fueling oxygen limited torque response of the conventional baseline engine. The determining the torque output value comprises interpolating between the zero fueling oxygen limited torque response and the high fueling oxygen limited torque response. In yet another embodiment, the interpolating comprises filtering a transient torque from the zero fueling oxygen limited torque response toward the high fueling oxygen limited torque response.

In still another embodiment, the method further includes determining the torque output value without the oxygen limited torque response in response to the filtered transient torque exceeding the torque curve of the internal combustion engine. In certain embodiments, the interpolating comprises modeling the torque response of the conventional baseline engine. In other embodiments, the interpolating comprises modeling the torque response of the conventional baseline engine at vehicle launch. In certain other embodiments, the interpolating comprises modeling the torque response of the conventional baseline engine at vehicle launch due to a lag of a turbocharger in the hybrid vehicle.

Another aspect involves a system that includes a hybrid vehicle including an electric motor, an internal combustion engine, a turbocharger, and a controller in electrical communication with the electric motor, the turbocharger, the internal combustion engine and one or more vehicle sensors operable to provide signals indicating conditions of the hybrid vehicle. The controller is structured to receive a total torque request of the hybrid vehicle, determine an oxygen limited torque response of a conventional baseline engine, interpret a torque curve of the internal combustion engine, determine a torque output value in response to the oxygen limited torque response and the torque curve, and provide an electrical torque command to the electric motor and a combustion torque command to the internal combustion engine based on the torque output value.

In one embodiment of the system, the conventional baseline engine comprises at least one of a displacement value of the conventional baseline engine being greater than a displacement value of the internal combustion engine, a torque rating of the conventional baseline engine being greater than a torque rating of the internal combustion engine, and a power rating of the conventional baseline engine being greater than a power rating of the internal combustion engine.

In another embodiment, the controller is further structured to determine a zero fueling oxygen limited torque response of the conventional baseline engine, and further determine the torque output value corresponding to the zero fueling oxygen limited torque response of the conventional baseline engine in response to a throttle tip-in event. In still another embodiment, the controller is further structured to determine a zero fueling oxygen limited torque response of the conventional baseline engine and a high fueling oxygen limited torque response of the conventional baseline engine, and further determine the torque output value based on an interpolation between the zero fueling oxygen limited torque response and the high fueling oxygen limited torque response.

In still another embodiment, the interpolation comprises at least one of a filtered transient torque filtered from the zero fueling oxygen limited torque response toward the high fueling oxygen limited torque response, a first model of the torque response based on the conventional baseline engine, a second model of the torque response based on the conventional baseline engine at vehicle launch, and a third model of the torque response based on the conventional baseline engine at vehicle launch due to a turbocharger lag. In yet another embodiment, the controller is further structured to further determine the torque output value without the oxygen limited torque response in response to the filtered transient torque exceeding the torque curve of the internal combustion engine. In yet still another embodiment, the controller is further structured to further determine the torque output value based on dynamics of a second turbocharger operably coupled to the conventional baseline engine.

Still another aspect involves an apparatus that includes a controller structured to receive one or more torque requests associated with a hybrid vehicle including an electric motor and an internal combustion engine. The controller includes a first torque response determination module structured to determine an oxygen limited torque response of a conventional baseline engine, a torque curve interpretation module structured to interpret a torque curve of the internal combustion engine, a torque output determination module structured to determine a torque output value based on the oxygen limited torque response and the torque curve, and a torque control module structured to provide at least one of an electrical torque command to the electric motor and a combustion torque command to the internal combustion engine, each based on the torque output value.

In one embodiment, the controller further includes a second torque response determination module structured to determine at least one of a zero fueling oxygen limited torque response of the conventional baseline engine and a high fueling oxygen limited torque response of the conventional baseline engine. In another embodiment, the torque output determination module is further structured to further determine the torque output value corresponding to the zero fueling oxygen limited torque response of the conventional baseline engine in response to a throttle tip-in event. In still another embodiment, the torque output determination module is further structured to further determine the torque output value based on an interpolation between the zero fueling oxygen limited torque response and the high fueling oxygen limited torque response.

In yet another embodiment, the interpolation comprises at least one of a first model of the torque response of the conventional baseline engine, a second model of the torque response of the conventional baseline engine at vehicle launch, and a third model of the torque response of the conventional baseline engine at vehicle launch due to a turbocharger lag. In still yet another embodiment, the interpolation comprises filtering a transient torque from the zero fueling oxygen limited torque response toward the high fueling oxygen limited torque response. The torque output determination module is further structured to further determine the torque output value without the oxygen limited torque response in response to the filtered transient torque exceeding the torque curve of the internal combustion engine.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising a controller performing the following steps, the method comprising:
   receiving a total torque request of a hybrid vehicle including an electric motor and an internal combustion engine;
   determining an oxygen limited torque response of a conventional baseline engine;
   interpreting a torque curve of the internal combustion engine;
   determining a torque output value in response to the oxygen limited torque response and the torque curve; determining a zero fueling oxygen limited torque response of the conventional baseline engine,
   wherein the determining the torque output value comprises determining the torque output value corresponding to the zero fueling oxygen limited torque response of the conventional baseline engine in response to a throttle tip-in event; and
   providing an electrical torque command to the electric motor and a combustion torque command to the internal combustion engine in response to the torque output value.

2. The method of claim 1, further comprising:
   determining a high fueling oxygen limited torque response of the conventional baseline engine, and
   wherein the determining the torque output value comprises interpolating between the zero fueling oxygen limited torque response and the high fueling oxygen limited torque response.

3. The method of claim 2, wherein the interpolating comprises filtering a transient torque from the zero fueling oxygen limited torque response toward the high fueling oxygen limited torque response.

4. The method of claim 3, further comprising:
   determining the torque output value without the oxygen limited torque response in response to the filtered transient torque exceeding the torque curve of the internal combustion engine.

5. The method of claim 2, wherein the interpolating comprises modeling the torque response of the conventional baseline engine.

6. The method of claim 5, wherein the interpolating comprises modeling the torque response of the conventional baseline engine at vehicle launch.

7. The method of claim 6, wherein the interpolating comprises modeling the torque response of the conventional baseline engine at vehicle launch due to a lag of a turbocharger in the hybrid vehicle.

8. A system, comprising:
   a hybrid vehicle including an electric motor, an internal combustion engine, a turbocharger, and a controller in electrical communication with the electric motor, the turbocharger, the internal combustion engine and one or more vehicle sensors operable to provide signals indicating conditions of the hybrid vehicle, wherein the controller is configured to:
   receive a total torque request of the hybrid vehicle;
   determine an oxygen limited torque response of a conventional baseline engine;
   interpret a torque curve of the internal combustion engine;
   determine a torque output value in response to the oxygen limited torque response and the torque curve;
   determining a zero fueling oxygen limited torque response of the conventional baseline engine,
   determining the torque output value corresponding to the zero fueling oxygen limited torque response of the conventional baseline engine in response to a throttle tip-in event; and
   provide an electrical torque command to the electric motor and a combustion torque command to the internal combustion engine based on the torque output value.

9. The system of claim 8, wherein the conventional baseline engine comprises at least one of a displacement value of the conventional baseline engine being greater than a displacement value of the internal combustion engine, a torque rating of the conventional baseline engine being greater than a torque rating of the internal combustion engine, and a power rating of the conventional baseline engine being greater than a power rating of the internal combustion engine.

10. The system of claim 8, wherein the controller is further configured to:
    determine a high fueling oxygen limited torque response of the conventional baseline engine, and
    further determine the torque output value based on an interpolation between the zero fueling oxygen limited torque response and the high fueling oxygen limited torque response.

11. The system of claim 10, wherein the interpolation comprises at least one of a filtered transient torque filtered from the zero fueling oxygen limited torque response toward the high fueling oxygen limited torque response, a first model of the torque response based on the conventional baseline engine, a second model of the torque response based on the conventional baseline engine at vehicle launch, and a third model of the torque response based on the conventional baseline engine at vehicle launch due to a turbocharger lag.

12. The system of claim 11, wherein the controller is further configured to further determine the torque output value without the oxygen limited torque response in response to the filtered transient torque exceeding the torque curve of the internal combustion engine.

13. The system of claim 8, wherein the controller is further configured to further determine the torque output value based on dynamics of a second turbocharger operably coupled to the conventional baseline engine.

14. An apparatus, comprising:
a controller that is configured to receive one or more torque requests associated with a hybrid vehicle including an electric motor and an internal combustion engine, wherein the controller includes:
   a first torque response determination module configured to determine an oxygen limited torque response of a conventional baseline engine;
   a second torque response determination module configured to determine at least one of a zero fueling oxygen limited torque response of the conventional baseline engine and a high fueling oxygen limited torque response of the conventional baseline engine;
   a torque curve interpretation module configured to interpret a torque curve of the internal combustion engine;
   a torque output determination module configured to determine a torque output value based on the oxygen limited torque response and the torque curve,
   wherein the torque output determination module is further configured to further determine the torque output value corresponding to the zero fueling oxygen limited torque response of the conventional baseline engine in response to a throttle tip-in event; and
   a torque control module configured to provide at least one of an electrical torque command to the electric motor and a combustion torque command to the internal combustion engine, each based on the torque output value.

15. The apparatus of claim 14, wherein the torque output determination module is further configured to further determine the torque output value based on an interpolation between the zero fueling oxygen limited torque response and the high fueling oxygen limited torque response.

16. The apparatus of claim 15, wherein the interpolation comprises at least one of a first model of the torque response of the conventional baseline engine, a second model of the torque response of the conventional baseline engine at vehicle launch, and a third model of the torque response of the conventional baseline engine at vehicle launch due to a turbocharger lag.

17. The apparatus of claim 15, wherein the interpolation comprises filtering a transient torque from the zero fueling oxygen limited torque response toward the high fueling oxygen limited torque response, and
   wherein the torque output determination module is further configured to further determine the torque output value without the oxygen limited torque response in response to the filtered transient torque exceeding the torque curve of the internal combustion engine.

* * * * *